United States Patent
Loubet Moundi

(10) Patent No.: US 10,242,233 B2
(45) Date of Patent: Mar. 26, 2019

(54) METHOD FOR PRODUCING AN ELECTRONIC DEVICE WITH A DISABLED SENSITIVE MODE, AND METHOD FOR TRANSFORMING SUCH AN ELECTRONIC DEVICE TO RE-ACTIVATE ITS SENSITIVE MODE

(71) Applicant: GEMALTO SA, Meudon (FR)

(72) Inventor: Philippe Loubet Moundi, La Ciotat (FR)

(73) Assignee: GEMALTO SA, Meudon (FR)

( * ) Notice: Subject to any disclaimer, the term of this patent is extended or adjusted under 35 U.S.C. 154(b) by 377 days.

(21) Appl. No.: 14/395,859

(22) PCT Filed: Jun. 5, 2013

(86) PCT No.: PCT/EP2013/061598
§ 371 (c)(1),
(2) Date: Oct. 21, 2014

(87) PCT Pub. No.: WO2013/189741
PCT Pub. Date: Dec. 27, 2013

(65) Prior Publication Data
US 2015/0086008 A1    Mar. 26, 2015

(30) Foreign Application Priority Data

Jun. 21, 2012   (EP) ................... 12305716

(51) Int. Cl.
*G06F 21/74*    (2013.01)
*H04L 9/32*     (2006.01)
(Continued)

(52) U.S. Cl.
CPC ....... *G06F 21/74* (2013.01); *G01R 31/31719* (2013.01); *G06F 21/73* (2013.01);
(Continued)

(58) Field of Classification Search
CPC ...... G01R 31/31719; G01R 31/318588; G06F 21/73; G06F 21/74; G06F 21/75;
(Continued)

(56) References Cited

U.S. PATENT DOCUMENTS

| 5,673,317 A | 9/1997 | Cooper |
| 2003/0020508 A1* | 1/2003 | Habersetzer ..... G01R 31/31701 324/750.3 |

(Continued)

FOREIGN PATENT DOCUMENTS

JP    2010133182 A    6/2010

OTHER PUBLICATIONS

International Search Report (PCT/ISA/210) dated Aug. 21, 2013, by the European Patent Office as the International Searching Authority for International Application No. PCT/EP2013/061598.

(Continued)

*Primary Examiner* — Theodore C Parsons
(74) *Attorney, Agent, or Firm* — Buchanan Ingersoll & Rooney PC

(57) ABSTRACT

A method is intended for transforming a secure electronic device, associated to a first identifier and having a sensitive mode disabled after production, for a new sensitive use. This method comprises the steps of: (i) externally computing a cipher of the first identifier with a predetermined function fed with this first identifier and a predetermined secret key; (ii) transforming an accessible metal layer of the electronic device to form an activation pattern representing this externally computed cipher of the first identifier; (iii) getting a value representative of this activation pattern into the electronic device; and (iv) computing a second identifier with this transformed electronic device by feeding a reverse function of the predetermined function with this value and (Continued)

this secret key, to trigger a comeback to the sensitive mode if this second identifier is equal to the first identifier.

13 Claims, 2 Drawing Sheets

(51) Int. Cl.
*G01R 31/317* (2006.01)
*G06F 21/73* (2013.01)
*G06F 21/75* (2013.01)
*G06F 21/77* (2013.01)
*G01R 31/3185* (2006.01)
*H01L 23/525* (2006.01)
*G11C 17/14* (2006.01)

(52) U.S. Cl.
CPC .............. *G06F 21/75* (2013.01); *G06F 21/77* (2013.01); *H04L 9/3236* (2013.01); *H04L 9/3242* (2013.01); *G01R 31/318588* (2013.01); *G06F 2221/2105* (2013.01); *G11C 17/14* (2013.01); *H01L 23/525* (2013.01); *H04L 2209/12* (2013.01)

(58) Field of Classification Search
CPC . G06F 21/77; G06F 2221/2105; G11C 17/14; H01L 23/525; H04L 2209/12; H04L 9/3236; H04L 9/3242; H04L 2209/24
See application file for complete search history.

(56) References Cited

U.S. PATENT DOCUMENTS

| 2003/0177373 | A1  | 9/2003  | Moyer et al. |                       |
|--------------|-----|---------|--------------|-----------------------|
| 2005/0289355 | A1  | 12/2005 | Kitariev et al. |                    |
| 2006/0114052 | A1* | 6/2006  | Fukuda       | G11C 17/14            |
|              |     |         |              | 327/525               |
| 2006/0202232 | A1  | 9/2006  | Takami       |                       |
| 2010/0264932 | A1* | 10/2010 | Marinissen   | G01R 31/31719         |
|              |     |         |              | 324/537               |
| 2010/0287374 | A1* | 11/2010 | Roy          | G06F 21/85            |
|              |     |         |              | 713/171               |

OTHER PUBLICATIONS

First Chinese Office Action issued by the State intellectual Property Office of the People's Republic of China dated Apr. 19, 2016 in corresponding Chinese application No. 201380032823.6, with partial English translation (8 pages).
Second Chinese Office Action issued by the State Intellectual Property Office of the People's Republic of China dated Sep. 26, 2016 in corresponding Chinese application No. 201380032823.6, with partial English translation (4 pages).
Notice of Grant dated Mar. 6, 2017 by the State Intellectual Property Office of the People's Republic of China on Sep. 26, 2016 in corresponding Chinese application No. 201380032823.6, with full English translation (4 pages).
Notice of Reasons for Rejection issued by the Japanese Patent Office dated Dec. 1, 2015 in corresponding Japanese application No. 2015-509466, with full English translation (10 pages).
Notice of Reasons for Rejection issued by the Japanese Patent Office dated Jul. 26, 2016 in corresponding Japanese application No. 2015-509466, with full English translation (4 pages).
Decision of Grant issued by the Japanese Patent Office dated Nov. 1, 2016 in corresponding Japanese application No. 2015-509466 (3 pages).
Notice of Preliminary Rejection issued by the Korean Intellectual Property Office dated Oct. 27, 2015 in corresponding Korean patent application No. 10-2014-70355851, with full English translation (6 pages).
Notice of Grant issued by the Korean Intellectual Property Office dated Apr. 29, 2016 in corresponding Korean patent application No. 10-2014-70355851 (3 pages).
Written Opinion issued by the Intellectual Property Office of Singapore dated Aug. 21, 2015 in corresponding Singaporean patent application No. 11201407057Q (5 pages).
Singapore Certificate of Grant issued by the Intellecutal Property Office of Singapore dated Jun. 30, 2016 in corresponding Singaporean application No. 1120140705Q (1 page).

* cited by examiner

METHOD FOR PRODUCING AN ELECTRONIC DEVICE WITH A DISABLED SENSITIVE MODE, AND METHOD FOR TRANSFORMING SUCH AN ELECTRONIC DEVICE TO RE-ACTIVATE ITS SENSITIVE MODE

TECHNICAL FIELD

The present invention relates to secure electronic devices or products having a sensitive mode (or functionality) that is disabled after production.

BACKGROUND OF THE INVENTION

As it is known by the man skilled in the art, some secure electronic devices, such as some smart cards, have a sensitive mode (such as a test mode) that is used during their production and then disabled to avoid attackers to use it to access to all their resources and thus to control them.

When such an electronic device has a working problem, it may be modified to activate its test mode again in order to determine the cause of this problem. But this modification is not only kept secret by the chip manufacturer who has developed this electronic device, but also complex, costly and not reliable (because it requires a focused ion beam (or FIB) manipulation), in order to be performed only by this chip manufacturer.

SUMMARY OF THE INVENTION

So, an objective of the invention is to allow authorized persons, and notably persons different from the chip manufacturer, to activate again the sensitive mode of a secure electronic device in an easy and secure manner, and at low cost (compared to existing solution).

More precisely, the invention provides notably a first method, intended for transforming a secure electronic device, associated to a first identifier and having a sensitive mode (or functionality) disabled after production, for a new sensitive use, and comprising the steps of:
  (i) externally computing a cipher of the first identifier with a predetermined function fed with the first identifier and a predetermined secret key,
  (ii) transforming an accessible metal layer of this electronic device to form an activation pattern representing this externally computed cipher of the first identifier,
  (iii) getting a value representative of the activation pattern into the electronic device, and
  (iv) computing a second identifier with the transformed electronic device by feeding a reverse function of the predetermined function with the value and the secret key, to trigger a comeback to the sensitive mode if this second identifier is equal to the first identifier.

The invention proposes to use a dedicated zone of the electronic device with a pattern that provides a value per default when no transformation is realized on it. A right transformation of the deactivation pattern triggers the comeback to the sensitive mode. The right transformation is only accessible if a specific calculation using a predetermined function, the first identifier of the electronic device and a secret key can be realized. If one does not know one or several of these three elements, one is not able to recover the sensitive mode. The invention renders possible to reenter the sensitive mode through an easy material modification while insuring a right protection of the sensitive mode.

The first transformation method according to the invention may include additional characteristics considered separately or combined, and notably:
  in step (iii) the value of the activation pattern may be a binary value or an analog value; adapted deactivation pattern and adapted transformation of the adapted activation pattern would correspond to these embodiments that enable the invention to be implemented in various situations;
  in step (ii) one may define the activation pattern by means of a cutting technique that is intended to remove metallic parts into locations of the metallic layer that are defined by the computed cipher of the first identifier; this embodiment enables a very simple operation of transformation of the pattern;
    the computed cipher of the first identifier may be defined by N bits that are respectively associated to N continuous lines of the metallic layer that belong to a security electronic circuit of the electronic device. In this case, an untransformed continuous line may represent a bit of the computed cipher of the first identifier that is equal to zero, while a continuous line transformed into an interrupted line may represent a bit of the computed cipher of the first identifier that is equal to one; this embodiment is a particularly simple and easy way of implementing the invention on classical integrated circuit device; N may be greater than one;
    the cutting technique may be chosen from a group comprising at least a laser cutting and a focused ion beam cutting;
  the predetermined function may be a cryptographic function;
    the cryptographic function may be chosen from a group comprising at least a simple Data Encryption Standard algorithm (DES), a triple Data Encryption Standard algorithm (TDES), an Advanced Encryption Standard algorithm (AES), a RSA algorithm, and other secret algorithms.

The use of a cryptographic function insures a secure transformation algorithm as well as an efficient protection of the sensitive mode.

The invention also provides a second method, intended for producing a secure electronic device associated to a first identifier and having a sensitive mode disabled after production, and comprising the steps of:
  (a) defining electronic circuits into this electronic device to perform predetermined functions, and notably a sensitive circuit intended for offering the sensitive mode,
  (b) defining a security circuit coupled to the sensitive circuit and intended for authorizing the sensitive circuit to offer the sensitive mode when it got a cipher of the first identifier, and
  (c) defining a deactivation pattern into an accessible metallic layer of the electronic device, which is arranged for inducing into the security circuit the generation of a value that is different from the cipher of the first identifier and therefore prevents the sensitive circuit to offer the sensitive mode.

The second production method according to the invention may include additional characteristics considered separately or combined, and notably:
  in step (c) one may define a deactivation pattern comprising N continuous lines associated respectively to N bits of the cipher of the first identifier;

a continuous line that is not transformed after a transformation phase may represent a bit of the computed cipher of the first identifier that is equal to zero, while a continuous line that is transformed into an interrupted line after a transformation phase may represent a bit of the computed cipher of the first identifier that is equal to one;

the deactivation pattern may comprise eight continuous lines (N=8); it could nevertheless be preferable a larger number N of thin continuous lines will be implemented ($2^N$ possibilities). Indeed the larger would be the better but a large number of modifications will decrease significantly the reliability of the transformation as errors may occur during the transformation. If the lines are hidden within standard top metal level patterns, even a small number of lines should be sufficient. As the transformation is not instantaneous and not easily reversible, tries and fails attacks are not possible. The number N will be adapted considering the targeted resistance versus the duration of the transformation.

the security circuit may be arranged for feeding a reverse function of a predetermined function with a predetermined secret key and the cipher of the first identifier for computing a second identifier, and for triggering a comeback of the electronic device to the sensitive mode if this second identifier is equal to the first identifier;

the predetermined function may be a cryptographic function;

the cryptographic function may be chosen from a group comprising at least a simple Data Encryption Standard algorithm, a triple Data Encryption Standard algorithm, an Advanced Encryption Standard algorithm, and a RSA algorithm;

it may be arranged for producing a secure electronic device that defines a chip of a smart card.

The invention also relates to a secure electronic device obtained by a production method of the invention.

Said electronic device is associated to a first identifier and comprises a sensitive mode circuit disabled after production. To enable a new sensitive use through a method of transformation of the electronic device according to one of the preceding claims, it comprises:

an accessible metal layer of said electronic device intended to be transformed to form an activation pattern representing said externally computed cipher of the first identifier, said activation pattern;

internal connections to get a value representative of said activation pattern into said electronic device, a circuit to compute a second identifier with said transformed electronic device by feeding a reverse function of said predetermined function with said value and said secret key and to trigger a comeback to said sensitive mode if said second identifier is equal to said first identifier.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The invention aims, notably, at offering a construction method, and an associated transformation method, intended for allowing a secure electronic device CH, having a disabled sensitive mode, to be activated again in its sensitive mode after use.

In the following description it will be considered that the (secure) electronic device CH is a chip of a smart card ED. For instance, this smart card ED may be a credit card or an electronic identity card or else an electronic passport. But the invention is not limited to this type of electronic device. It concerns any type of electronic device having a sensitive mode that is disabled after production, and notably chips of Set-Top boxes, embedded secure elements, mobile phone application processors with embedded security, and complete handset devices.

Moreover in the following description it will be considered that the sensitive mode is a test mode.

Figure 1:
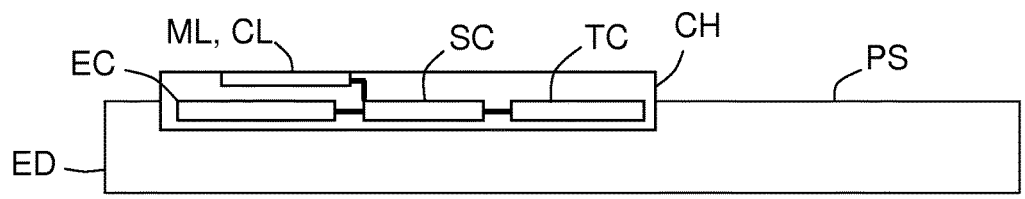
FIG. 1 schematically illustrates, in cross-section, an example of embodiment of a secure electronic device produced by means of a production method according to the invention, FIG. 2 schematically and functionally illustrates, in top view, relations between the components of the secure electronic device of FIG. 1 before transformation (i.e. with a deactivation pattern), FIG. 3 schematically and functionally illustrates, in top view, relations between the components of the secure electronic device of FIG. 1 after transformation (i.e. with an activation pattern), and FIG. 4 schematically illustrates an example of algorithm that can be used to implement a transformation method according to the invention.
Figure 2:
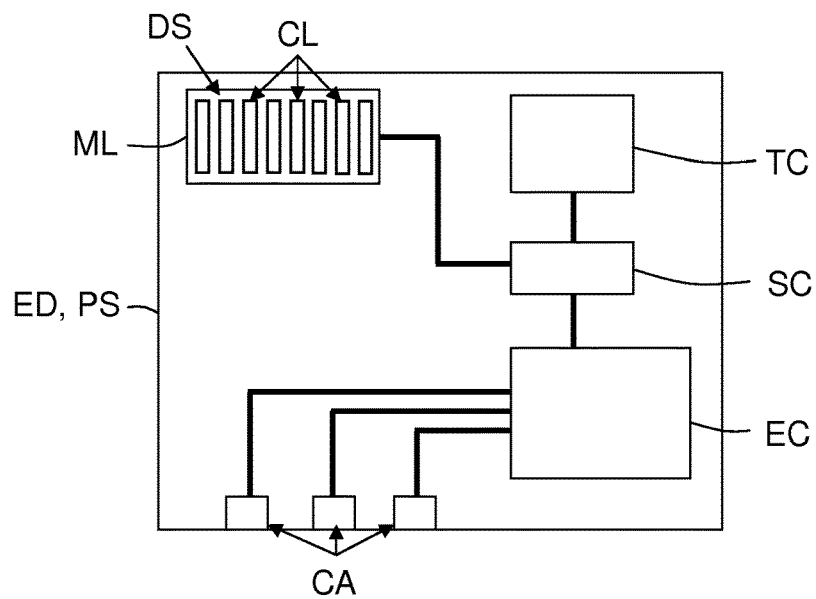
Figure 3:
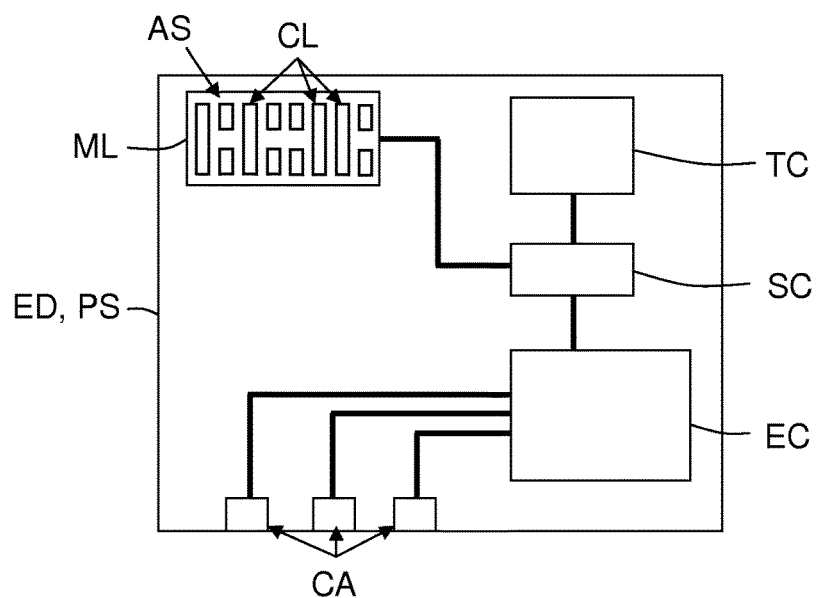

In the example illustrated in FIGS. 1 to 3 the chip CH is attached fixedly to a support PS, for instance in plastic material. As mentioned above, in this example the support PS and the chip CH constitute a smart card ED (or secure electronic device).

This chip CH is a secure electronic device that is produced by means of a production method according to the invention.

Such a production method comprises three steps (a), (b) and (c).

The first step (a) consists in defining electronic circuits EC, SC and TC into the chip CH in order it could perform predetermined functions. One of these electronic circuits is a sensitive circuit TC that is intended for offering a sensitive mode. So, in the described example, the sensitive circuit TC is a test circuit arranged for performing internal tests in an authorized test mode.

The second step (b) consists in defining a security circuit SC coupled to the test circuit TC and to other electronic circuits EC, and intended for authorizing the test circuit TC to offer the test (or sensitive) mode when it got (or has generated internally) a value V that is a cipher CR of a first identifier I1 that is associated to the chip CH.

This security circuit SC acts as a security interface between the test circuit TC and remaining electronic circuits EC that may be grouped into a processor (or CPU), as illustrated in FIGS. 2 and 3, for instance.

This first identifier I1 is preferably stored in an internal memory of the chip CH that is accessible to the security circuit SC and may be part of the processor EC. This first identifier I1 may be the "signature" of the chip CH. It may be alphanumerical.

The third step (c) consists in defining a deactivation pattern DS into an accessible metallic layer ML of the chip CH, which is arranged for inducing into the security circuit SC the generation of a value V that is different from the cipher CR of the first identifier I1 and therefore prevents the test circuit TC to offer the test (or sensitive) mode.

As illustrated in FIGS. 2 and 3, the chip CH comprises also several contact areas CA intended to be contacted by an external device to allow interactions with some of the electronic circuits EC.

The accessible metallic layer ML may be the last layer defined on the top of the chip CH. But this is not mandatory. Indeed, at least its deactivation pattern DS could be defined below a protective layer easy to remove.

The security circuit SC is preferably arranged for feeding a reverse function $F^{-1}$ of a predetermined function F with a predetermined secret key K and the value V that it generates internally because it is connected to the deactivation pattern DS or to an activation pattern AS produced by transformation of the deactivation pattern DS as explained below. So, when the generated value V is different from the cipher CR of the first identifier I1, the feeding of the reverse function $F^{-1}$ provides a second identifier I2 (i.e. $F^{-1}(K, V)=I2$) which differs from the first identifier I1, and therefore the security circuit SC does not authorize a comeback of the chip CH to its test mode. But, when the generated value V is equal to the cipher CR of the first identifier I1, the feeding of the reverse function $F^{-1}$ provides a second identifier I2 (i.e. $F^{-1}(K, CR)=I2$) which is equal to the first identifier I1, and therefore the security circuit SC authorizes a comeback of the chip CH to its test mode.

The predetermined secret key K is known by the chip manufacturer.

For instance, this predetermined function F is a cryptographic or ciphering function.

This ciphering or cryptographic function F may be the so called simple Data Encryption Standard algorithm (or DES). But, it could be also a triple Data Encryption Standard algorithm (or TDES), or an Advanced Encryption Standard algorithm (or AES), or else a RSA algorithm (Rivest Shamir Adleman), for instance. It can be preferable to use a secret customized algorithm, particularly in case of onboard implementation of the invention on small embedded systems.

As illustrated in the non-limiting example of FIG. 2, a deactivation pattern DS may comprise N continuous lines CL associated respectively to N bits of the cipher CR of the first identifier I1. In the non-limiting example of FIG. 2, N is equal to eight, but this is not mandatory. Indeed N may be equal to any number greater than one.

Each continuous line CL couples at least two parts of the security circuit SC which contribute to the internal generation of the value V. These parts may be gates of integrated electronic components, such as transistors, for instance.

For instance, a continuous line CL represents a bit of the value V that is equal to zero (0) for the security circuit SC, while an interrupted line represents a bit of the value V that is equal to one (1) for the same security circuit SC. The reverse situation is also possible (a bit equal to zero is represented by an interrupted line, while a bit equal to one is represented by a continuous line).

So, when a continuous line CL couples two parts of the security circuit SC, the latter (SC) is set in a first state, and when this continuous line CL is interrupted these two parts are no more coupled and then the security circuit SC is set in a second state. The contributions of all the security circuit parts coupled by the N continuous line CL define together the value V.

As mentioned above, the invention also proposes a transformation method intended for transforming an electronic device CH, produced by means of the production method described above, in order to activate again its disabled test mode for testing purpose after use.

This transformation method comprises three steps (i), (ii) and (iii).

The first step (i) consists in externally computing a cipher CR of the first identifier I1 with the predetermined function F fed with the first identifier I1 of the chip CH and the predetermined secret key K, described above (so, $F(K, I1)=CR$).

The predetermined secret key K is also known by the man who proceeds to the chip transformation.

The first identifier I1 is either known by the man who proceeds to the chip transformation, or determined into the chip CH by means of a command that is transmitted by a computer to its contact areas CA. Such a command could be "get_I1", for instance. Upon reception, this command triggers the search of the first identifier I1 into the chip CH, and once it has been found this first identifier I1 is transmitted to the requesting computer through the contact areas CA.

The second step (ii) consists in transforming the accessible metal layer ML of the chip CH (and more precisely its deactivation pattern DS) to form an activation pattern AS that represents the externally computed cipher CR of the first identifier I1 and that is intended to modify (or replace) the value V generated into the security circuit SC.

This activation pattern AS may be defined by means of a cutting technique that is intended to remove (or destroy) metallic parts into locations of the deactivation pattern DS of the metallic layer ML that are defined by the cipher CR of the first identifier I1, externally computed during the first step (i).

Any cutting technique known by the man skilled in the art, and allowing removal (or destruction) of metallic parts into a metallic layer may be used. So, it may be a laser cutting or a focused ion beam (or FIB) cutting, for instance.

In the non-limiting example illustrated in FIG. 2, the deactivation pattern DS comprises N continuous lines CL associated respectively to N bits of the value V (and therefore of the cipher CR of the first identifier I1), with N=8. It is here noted that to insure a right protection of the sensitive mode, larger number on continuous lines will be implemented in reality to enable an operator to "write" the cipher on this set of continuous lines. The cipher will effectively be preferably coded on a large number of bits.

So, if each continuous line CL represents a bit of the value V that is equal to zero, then the value V, represented by the deactivation pattern DS before transformation, is equal to 0x00 (i.e. the value 0 for a 8 bits number). Now, if each interrupted line, obtained by the transformation of a continuous line CL by means of the cutting technique, represents a bit of the cipher CR of the first identifier I1 that is equal to one, then the activation pattern AS, illustrated in FIG. 3 and resulting from the transformation of the deactivation pattern DS of FIG. 2, may represent the value 0x59 of the cipher CR of the first identifier I1 (i.e. the binary number 01011001).

A lot of other activation patterns AS made of different combinations of continuous lines CL and interrupted lines (obtained by the transformation of continuous lines CL by means of the cutting technique) may be used to define numerous ciphers CR of the first identifier I1 for numerous chips CH.

The third step (iii) consists in getting a value V representative of the activation pattern AS into the electronic device CH. As mentioned above, the value V is generated inside the security circuit SC because it is connected to the activation pattern AS resulting from the transformation of the deactivation pattern DS.

This value V may be a binary value or an analog value. In the last case, a resistance, a capacitance or an inductance modification is obtained by trimming the deactivation pattern DS.

The fourth step (iv) consists in computing a second identifier I2 with the transformed chip CH (and more precisely with its security circuit SC) by feeding the reverse function $F^{-1}$ of the predetermined function F with the generated value V (which is supposed to be the cipher CR of the first identifier I1) and the secret key K (so, $F^{-1}$(K, CR)=I2). Then, if this second identifier I2 is equal to the first identifier I1 (I2=I1, because V=CR), the security circuit SC triggers a comeback of its chip CH to the test mode. In other words, the security circuit SC authorizes the use of the test circuit TC, here for testing purpose. Now, if the second identifier I2 differs from the first identifier I1 (I2≠I1, because V≠CR), the security circuit SC does not trigger a comeback of its chip CH to the test mode. In other words, the security circuit SC does not authorize the use of the test circuit TC, and therefore the chip CH can just be used in its user mode which does not allow an attacker to access to its internal resources.

Figure 4:
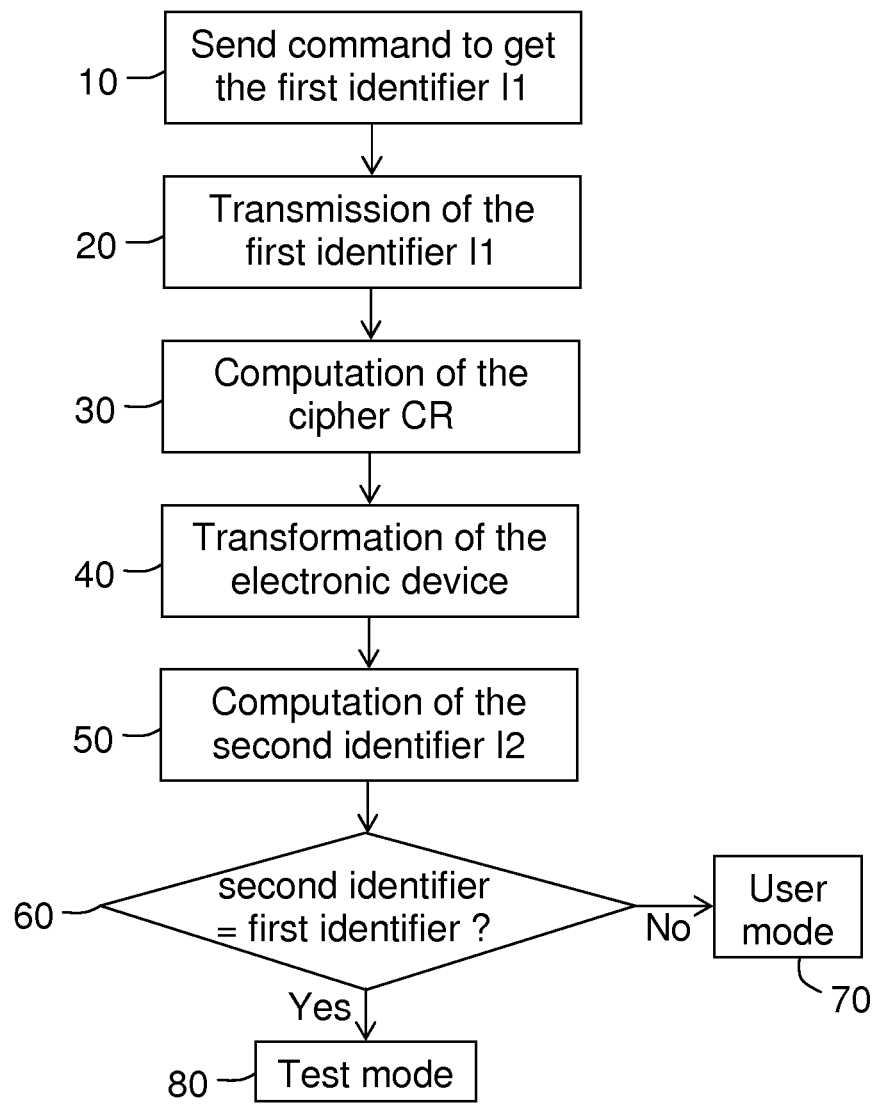

A non-limiting example of algorithm implementing the transformation method described above is schematically illustrated in FIG. 4.

This algorithm starts with a first optional step 10 consisting in transmitting a command requesting the first identifier I1 from an external computer to the chip CH.

Then the algorithm comprises a second optional step 20 consisting in searching the first identifier I1 into the chip CH, and then transmitting this first identifier I1 to the requesting computer.

Then the algorithm comprises a third step 30 consisting in externally computing a cipher CR of the first identifier I1 with the predetermined function F fed with the first identifier I1 and a predetermined secret key K (F(K, I1)=CR). This can be done into the requesting computer.

Then the algorithm comprises a fourth step 40 consisting in transforming the deactivation pattern DS of the chip CH to define an activation pattern AS representing the cipher CR of the first identifier I1 and that is intended to modify (or replace) the value V generated into the security circuit SC.

Then the algorithm comprises a fifth step 50 consisting in switching the chip CH on, then in getting into the security circuit SC the value V internally generated and representative of the activation pattern AS, and then in executing the reverse function $F^{-1}$ with V (equal to CR) and K as parameters to compute a second identifier I2 ($F^{-1}$(K, CR)=I2) into the security circuit SC.

Then the algorithm comprises a sixth step 60 consisting in comparing the computed second identifier I2 with the first identifier I1 stored into the transformed chip CH. If the second identifier I2 differs from the first identifier I1 (I2≠I1), the algorithm follows with a seventh step 70 consisting in forbidding the comeback of the chip CH to the test mode. So, the chip CH can only be used in user mode. Now, if the computed second identifier I2 is equal to the first identifier I1 (I2=I1), the algorithm follows with an eighth step 80 consisting in authorizing the comeback of the chip CH to the test mode.

The invention offers several advantages, and notably:
it allows a simple way to disable a sensitive mode during chip production,
it allows a simple but secure sensitive mode re-activation through a simple chip transformation,
it allows re-use of the chip after testing by a transformation of its activation pattern into the initial deactivation pattern,
it allows a diversified transformation per chip,
it allows having a transformation resistant to brute force attack,
it allows having N continuous lines hidden within normal structure of the top metal level of the circuit.

The invention is not limited to the embodiments of transformation method and construction method described above, only as examples, but it encompasses all alternative embodiments which may be considered by one skilled in the art within the scope of the claims hereafter.

The invention claimed is:

1. A method for transforming a secure electronic device, associated with a first identifier and having a sensitive mode disabled after production, for a new sensitive use, comprising the steps of: (i) receiving an externally computed cipher of said first identifier, said externally computed cipher having been computed with a predetermined function of said first identifier and a predetermined secret key; (ii) transforming an accessible metal layer of said electronic device to form an activation pattern representing said externally computed cipher of the first identifier, said accessible metal layer being transformable using a laser cutting technique that removes metallic parts in locations of said metallic layer that are defined by said computed cipher of said first identifier; (iii) within the secure electronic device, generating a value based upon said transformed accessible metal layer; (iv) computing a second identifier with said transformed electronic device by feeding a reverse function of said predetermined function with said generated value and said secret key; and (v) comparing said second identifier to said first identifier to trigger a comeback to said sensitive mode if said second identifier is equal to said first identifier, wherein said computed cipher of said first identifier is defined by N bits that are respectively associated with N continuous lines of said metallic layer belonging to a security circuit of said electronic device, and an untransformed continuous line representing a bit of said computed cipher of the first identifier that is equal to zero, while a continuous line transformed into an interrupted line represents a bit of said computed cipher of the first identifier that is equal to one.

2. A method according to claim 1, wherein in step (iii) said value representative of said activation pattern is a binary value or an analog value.

3. A method according to claim 1, wherein N is greater than one.

4. A method according to claim 1, wherein said predetermined function is a cryptographic function.

5. A method according to claim 4, wherein said cryptographic function is chosen from a group comprising at least a simple Data Encryption Standard algorithm, a triple Data Encryption Standard algorithm, an Advanced Encryption Standard algorithm, and a RSA algorithm.

6. The method of claim 1 wherein the accessible metal layer is a top layer of said secure electronic device.

7. A method for producing a secure electronic device associated with a first identifier and having a sensitive mode disabled after production, comprising the steps of: (a) providing electronic circuits in said electronic device to perform predetermined functions, including a sensitive circuit that enables said sensitive mode, (b) providing a security circuit adapted to perform a reverse function using a key and a value based upon a pattern read from an accessible metallic layer which is transformable using a laser cutting technique, said security circuit being coupled to said sensitive circuit that authorizes said sensitive circuit to enable said sensitive mode when it obtains a first identifier from the reverse function, and (c) providing a deactivation pattern in the accessible metallic layer of said electronic device, which is configured to induce said security circuit to generate a value by the reverse function that is different from said first identifier and thereby prevent said sensitive circuit from enabling said sensitive mode, the deactivation pattern comprising N continuous lines associated respectively with N bits of said cipher of the first identifier.

8. A method according to claim 7, wherein a continuous line of said deactivation pattern that is not transformed after a transformation phase represents a bit of said computed cipher of said first identifier that is equal to zero, and a continuous line that is transformed into an interrupted line after a transformation phase represents a bit of said computed cipher of the first identifier that is equal to one.

9. A method according to claim 7, wherein said security circuit is configured to compute a reverse function of a predetermined function of a predetermined secret key and said cipher of the first identifier to generate a second identifier, and to trigger a comeback of said electronic device to said sensitive mode if said second identifier is equal to said first identifier.

10. A method according to claim 9, wherein said predetermined function is a cryptographic function.

11. A method according to claim 10, wherein said cryptographic function is chosen from a group comprising at least a simple Data Encryption Standard algorithm, a triple Data Encryption Standard algorithm, an Advanced Encryption Standard algorithm, and a RSA algorithm.

12. A method according to claim 7, wherein the secure electronic device comprises a chip of a smart card.

13. A secure electronic device obtained by a method according to claim 7.

* * * * *